United States Patent [19]

Ettenberg et al.

[11] 4,195,269

[45] Mar. 25, 1980

[54] TWO-WAY SINGLE FIBER OPTICAL COMMUNICATION SYSTEM

[75] Inventors: Michael Ettenberg, Freehold; Henry Kressel, Elizabeth, both of N.J.

[73] Assignee: RCA Corporation, New York, N.Y.

[21] Appl. No.: 897,808

[22] Filed: Apr. 19, 1978

[51] Int. Cl.² .......................... H04B 9/50; H01S 3/10
[52] U.S. Cl. ............................ 332/7.51; 455/612; 455/613; 455/617
[58] Field of Search ..................... 332/7.51; 250/199

[56] References Cited

U.S. PATENT DOCUMENTS

| | | | |
|---|---|---|---|
| 3,584,220 | 6/1971 | Namupa et al. | 250/199 |
| 3,989,942 | 11/1976 | Waddoups | 356/152 |
| 4,070,118 | 1/1978 | Maslowski et al. | 356/237 |

OTHER PUBLICATIONS

Mitsuhashi et al., "Self Coupled Optical Pickup," 4/76, pp. 5–7, Optics Commun., vol. 17, #1.
Wettke et al., "Optimized LED For Single Fiber Optical Links," 2/76, pp. 1–79, RCA Lab. Final Rept. PRRL-76-CR-15 Abst.
Seko et al., "Self-Quenching. . .Readout," 8/1/75, pp.140–141, Appl. Phys. Lett., vol. 27, #3.
Morikawa et al., "Return Beam. . .Lasers," 8/19/76, pp. 435–436, Electronic Letters, vol. 12, #17.

*Primary Examiner*—Nelson Moskowitz
*Attorney, Agent, or Firm*—H. Christoffersen; D. S. Cohen

[57] ABSTRACT

An injection laser diode is at one end of an optical fiber to direct modulated optical radiation into the fiber. At the other end of the fiber is a detector, such as a semiconductor photodetector, for the modulated radiation. Between the other end of the optical fiber and the detector is a reflecting shutter which is adapted to periodically reflect some of the radiation, at a lower frequency rate, back along the optical fiber to the injection laser. The radiation reflected back into the injection laser causes a variation in the characteristics of the laser so that the laser operates as a detector for the reflected radiation.

6 Claims, 1 Drawing Figure

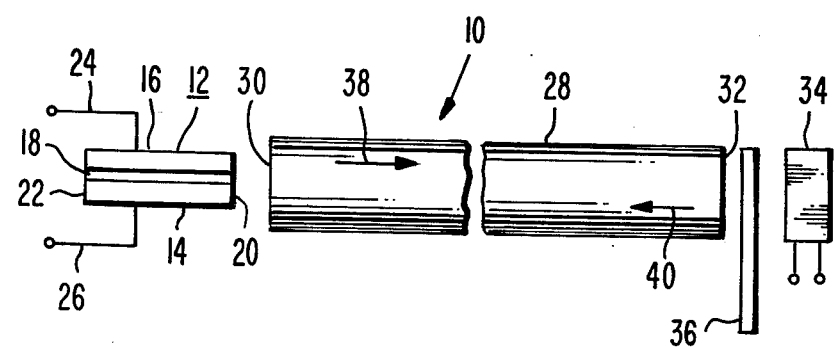

TWO-WAY SINGLE FIBER OPTICAL COMMUNICATION SYSTEM

The present invention relates to a two-way optical communication system and particularly to such a system using a single optical fiber and a minimum number of radiation source and detector devices.

Recently consideralbe interest has developed in optical communication systems in which a source of optical radiation directs modulated radiation into one end of an optical fiber and a detector is at the other end of the fiber for detecting the modulated radiation and converting it into electrical signals. One type of device which is used for the source of optical radiation because of its small size and relatively low power consumption is an injection laser diode. The detector which is generally used is a semiconductor photodetector, such as a PIN or avalanche diode. For certain communication systems it is desirable to have a two way communication system between two locations. Although two separate optical fibers with optical radiation sources and detectors at the ends of each fiber could be used, to simplify the system it would be more desirable to use a single fiber to convey the optical radiation in both directions. Although a single fiber can carry the optical radiation in both directions at the same time, it is difficult to couple each end of the fiber to both a source of the radiation and a detector. The present invention relates to an optical communication system in which the source of the optical radiation also serves as the detector for the return radiation and some of the radiation directed along the optical fiber from the radiation source is reflected back along the fiber to provide the return radiation.

The FIGURE of the drawing is a schematic view of an embodiment of a communication system embodying the present invention.

Referring to the drawing, the embodiment of the two way communication system shown therein is generally designated as 10. The optical communication system 10 includes a source 12 of optical radiation which is a semiconductor injection laser diode. The laser diode 12 is preferably a double-heterojunction structure which is capable of room temperature CW operation. Such a laser diode 12 in general includes regions 14 and 16 of opposite conductivity types having a third region 18 sandwiched therebetween. The intermediate region 18 may be of either conductivity type. The intermediate region 18 is of a material having an index of refraction higher than that of the material of the portions of the regions 14 and 16 along the intermediate region 18. For example, the intermediate region 18 may be of gallium arsenide and the regions 14 and 16 may be of aluminum gallium arsenide. Thus, there is provided the two heterojunctions along the sides of the intermediate region 18 for confining the radiation generated in the laser 12 to the intermediate region 18. Although there are various constructions of such a double-heterojunction laser diode, the detail construction of one such double-heterojunction laser diode which can be used is described in the article of H. Kressel et al., "Heterojunction Laser Diodes For Room Temperature Operation", *OPTICAL ENGINEERING,* Vol. 13, No. 5, September/October 1974, pgs. 416–422. The end surfaces 20 and 22 of the laser diode 12 are at least partially reflecting so as to form a Fabry-Perot cavity with at least the end surface 20 being at least partially transparent to permit emission of the radiation from the laser diode 12. The laser diode 12 is electrically connected to a source of power for operating the diode through terminals 24 and 26.

An optical fiber 28 has one end surface 30 adjacent to and aligned with the radiation emitting end surface 20 of the laser diode 12. Thus, radiation from the laser diode 12 is directed into the end of the optical fiber 28. The optical fiber 28 may be of any well known construction which will transmit the radiation from the one end 30 to the other end 32 of the fiber.

Adjacent and aligned with the other end 32 of the optical fiber 28 is a radiation detector 34. Although the radiation detector 34 can be any well known detector which is capable of converting the optical radiation from the laser diode 12 to an electrical signal, the detector 34 is preferably a semiconductor photodetector. One suitable photodetector is a PIN or avalanche diode of the construction described in the article of H. Melchior, "Sensitive High Speed Photodetectors for the Demodulation of Visible and Near Infrared Light", *JOURNAL OF LUMINESCENCE* Vol. 7, 1973, pgs. 390–412.

Between the detector 34 and the end 32 of the optical fiber 28 is a reflecting shutter 36. The reflecting shutter 36 may be a mirror which is mounted to be selectively moved across at least a portion of the path of the radiation being emitted from the end 32 of the fiber 28. Alternatively, reflective shutter 36 may be a liquid crystal device which can be switched between a state wherein it is transmissive to the radiation and a state wherein it is reflecting.

In the operation of the communications system 10, the laser diode 12 is operated to emit a modulated beam of optical radiation. This beam of radiation is directed into the end 30 of the optical fiber 28 and travels along the fiber in the direction of the arrow 38. The beam of radiation exits the fiber at the end 32 where it impinges on the detector 34. The detector 34 converts the optical radiation to an electrical signal which corresponds to the information being conveyed. The shutter 36 is selectively operated to reflect some of the optical radiation emitted from the fiber 28 back into the fiber. The shutter 36 is operated so that the reflected radiation is modulated to correspond to desired information. Preferably, the reflected radiation is modulated at a much lower frequency than the frequency of the modulated radiation emitted from the laser diode 12. For example, the radiation emitted from the laser diode 12 may be at a data rate greater than 10 MHz, whereas the reflected radiation might be a data rate of only one kHz.

The radiation reflected back into the optical fiber 28 will then flow along the optical fiber in the direction of the arrow 40. The reflected radiation will exit the fiber at the end 30 and be directed back into the laser diode 12.

It has been found that when radiation is directed back into a laser diode certain of the operating characteristics of the diode will change. Such changes include a change in the optical output of the laser diode, a change in the current at constant voltage or a change in the voltage at constant current. Thus, by monitoring the change in any one of these characteristics of the laser diode 12 the amount of radiation entering the laser diode can be determined. Changes in the output radiation can be measured by constructing the laser diode 12 so that some of the radiation is also emitted from the end surface 22, and a radiation detector can be used to measure changes in the emitted radiation. Changes in either the current or voltage across the laser diode can be measured with suitable meters connected across the laser diode terminals. Thus, the laser diode 12 is used as a detector to detect the radiation reflected back along the optical fiber to determine the returned information.

Thus, in the communication system 10, the laser diode 12 serves as the source of radiation with the radiation directly emitted from the laser diode 12 being modulated to provide the transfer of information in one direction along the optical fiber 28. In addition, the laser diode 12 serves as a detector for the reflected radiation to provide the information transmitted in the other direction along the optical fiber 28. At the other end of the optical fiber 28 a single detector 34 is used to pick up the information transmitted in the one direction and a reflecting shutter 36 is used to provide the returned information in the form of the reflected radiation. Thus, the communication system 10 embodying the present invention provides two way communication along a single optical fiber using a minimum number of radiation source and detector devices.

We claim:
1. A two way optical communication system comprising:
(a) first means for providing a beam of modulated optical radiation,
(b) second means for detecting the modulated optical radiation from said first means,
(c) third means for carrying said beam of optical radiation from said first means to said second means,
(d) fourth means between the second means and the third means periodically operable between a condition in which it allows the beam of radiation to reach the second means and a condition in which it reflects the beam of radiation back along said third means toward said first means, and
(e) said first means also serving to detect the radiation reflected back along said third means.

2. A two way optical communication system in accordance with claim 1 in which said first means is a semiconductor injection laser diode having an end surface from which the beam of optical radiation is emitted.

3. A two way optical communication system in accordance with claim 2 in which said third means is an optical fiber having one end adjacent said end surface of the laser diode.

4. A two way optical communication system in accordance with claim 3 in which said fourth means is a reflecting shutter.

5. A two way optical communication system in accordance with claim 4 in which said second means is a photodetector which converts optical radiation to an electrical signal.

6. A two way optical communication system in accordance with claim 5 in which the photodetector is a semiconductor photodetector.

* * * * *